3,167,552
PROCESS FOR THE PREPARATION OF 3-PHENYL-4-HYDROXYCINNOLINES
Harman S. Lowrie, Glenview, Ill., assignor to G. D. Searle & Co., Chicago, Ill., a corporation of Delaware
No Drawing. Filed June 28, 1963, Ser. No. 291,250
4 Claims. (Cl. 260—250)

The present invention relates to a new method for the preparation of hydroxycinnolines. More particularly, it relates to the preparation of 4-hydroxy-3-phenylcinnolines from the coresponding 3-phenylcinnoline4-carboxylic acids. The transformation involved herein can be illustrated by the following equation:

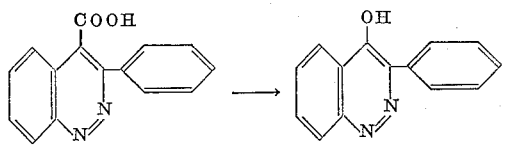

The preparation of a number of cinnolines is reported in the prior art and, actually, two practical methods for the preparation of 4-hydroxy-3-phenylcinnolines have been described. According to one such procedure, 2-nitrobenzaldehyde is reacted with phenylacetic acid to give 2-nitro-α-phenylcinnamic acid. This compound is decarboxylated to 2-nitrostilbene which is converted to the corresponding dichloride, isomerized, and then dehydrohalogenated to give 2-nitrotolan. Reduction of the nitro compound gives the corresponding amino compound which, upon diazotization, cyclizes to 4-hydroxy-3-phenylcinnoline. It will be obvious that the indicated procedure is long so that, even if the yields in the individual steps are satisfactory, the overall yield would be reduced considerably by the large number of steps involved. In addition, although the starting materials for the specific preparation described above (2-nitrobenzaldehyde and phenylacetic acid) are readily available, substituted 2-nitrobenzaldehydes and substituted phenylacetic acids which would be useful for preparing Ar-substituted phenylcinnolines generally are not so readily available.

A second known procedure for the preparation of 4-hydroxy-3-phenylcinnolines involves the diazotization of 2-amino-α-arylacetophenones with cyclization to give the cinnoline. Again, it is necessary to resort to a several step procedure in order to obtain the starting materials and the drawbacks to this method are similar to those for the procedure described above.

It is therefore an object of this invention to provide a new method for the preparation of 4-hydroxy-3-phenylcinnolines. This method is a single step procedure starting from 3-phenylcinnoline-4-carboxylic acids which are readily available by a known 3-step procedure. That is, 3-phenylcinnoline-4-carboxylic acid is obtained from phenylhydrazine and benzaldehyde which react readily to give the phenylhydrazone of benzaldehyde, and this is then reacted with oxalyl chloride to give 1-benzalaminoisatin. Rearrangement of the isatin under alkaline conditions gives 3-phenylcinnoline-4-carboxylic acid in excellent overall yield. It should be obvious that substituted phenylhydrazines and substituted benzaldehydes can also be used in this procedure and any number of such starting compounds are readily available. Thus, the present procedure can be used for the preparation of compounds which are substituted in the cinnoline nucleus and/or in the phenyl ring.

Since, as indicated above, satisfactory procedures for the preparation of 3-phenylcinnoline-4-carboxylic acids are already known in the art, it is the principal object of this invention to provide a method whereby such carboxylic acids can be used to prepare the corresponding hydroxy compounds in a single step. Other and related objects will appear hereinafter.

According to the present invention, the foregoing and related objects are attained by heating the cinnolinecarboxylic acid, as its potassium salt, with potassium hydroxide and copper bronze powder or copper oxide or a combination of copper bronze powder and copper oxide in an inert diluent. Preferably, the reaction is carried out in the presence of an excess of base. Potassium hydroxide is the preferred base for this purpose.

In view of the high reactivity of concentrated potassium hydroxide mixtures, particularly at high temperatures, a number of limitations are thereby introduced into the method for carrying out the reaction. Thus, the diluent used should be relatively inert chemically and unaffected by the action of hot base. The diluent should likewise have the proper physical properties. Thus, it should be a liquid at room temperature or close to room temperature and it should not boil below a temperature of about 300° C., a temperature slightly above that at which reaction takes place. Polyethylene glycols and mineral oil are examples of diluents having the desired properties. Actually, the exact nature of these materials can vary. Thus, the precise composition of the mineral oil may vary depending on the particular source of the oil and the method and extent of purification. However, these points are of no particular consequence as long as the material has the necessary characteristics referred to above—inertness to base and a boiling point that is not below the temperature indicated.

As suggested above, the upper temperature limit for carrying out the reaction can be restricted by the boiling point of the particular diluent used. However, for high boiling diluents, it is not necessary to heat the mixture to the boiling point although such heating can be carried out to insure completion of the reaction. Actually, in the case of high boiling diluents, heating to a temperature of about 350° C. is sufficient. The reaction itself commences at a temperature of about 270–280° C., although this particular temperature may vary depending on the concentration of the reactants and the particular nature of the specific cinnoline used. However, under any circumstances, it is desirable to heat the reaction mixture to at least 300° C. to ensure that the reaction will proceed satisfactorily. It should be noted that the reaction is exothermic, although this fact may not be particularly evident when the reaction is carried out at relatively high dilution.

The relative amount of diluent used in the reaction can be varied without altering the course of the reaction. However, moderate concentration is preferable, about 8 ml. of diluent per gram of starting material. When higher concentration of reactants are used, agglomeration becomes a problem and all of the starting material does not react or side reactions take place. On the other hand, use of high dilution makes the preparation of large quantities of material rather tedious.

It should be noted that glass vessels are attacked by hot base under the relatively extreme conditions under which the reaction is carried out and the silicates formed as a result are difficult to separate from the products of the reaction. Thus, if a pure product is desired, it is preferable to avoid the use of glass and to use copper reaction vessels instead.

Copper bronze powder or copper oxide promote the reaction under consideration. It is necessary to have at least one of these materials present in the reaction mixture in order to obtain a significant yield of product from the procedure. However, the best results are obtained when both copper oxide and copper bronze are present in the mixture. The ratio of the amounts of these two agents can be varied and, although good results are obtained when they are present in a ratio of 1:1 parts by weight, other proportions also give quite satisfactory results.

It should be further recognized that since the intermediate 1-benzylideneaminoisatin is converted to the cinnoline-4-carboxylic acid in the presence of a base, it should be possible to go from the 1-benzylideneaminoisatin to the 4-hydroxycinnoline in a single step without isolating the intermediate carboxylic acid. Since such a procedure would, in actuality, involve a 2-step reaction wherein the second step is essentially the same as the procedure of the present invention, such a procedure does not avoid the present invention.

Although the preceding discussion gives a satisfactory description of the conditions used for carrying out the method of the present invention, the procedure can be illustrated specifically as follows:

25 grams of 3-phenylcinnoline-4-carboxylic acid and 50 ml. of 50% potassium hydroxide solution are dissolved in sufficient methanol to bring about solution of the materials. The solvent is then evaporated from the mixture at reduced pressure. The dried residue is then ground up to a fine powder and suspended in 200 ml. of mineral oil together with 50 g. of copper bronze powder and 50 g. of copper oxide. The mixture is stirred and heated rapidly. At a temperature of about 300° C., rapid evolution of gas commences. Heating is then continued up to a temperature of about 350° C. at which point gas evolution has essentially stopped. The reaction mixture is then cooled quickly and it is diluted with Skellysolve L (a mixture of hydrocarbons, essentially octanes, boiling at about 91–126° C.). The mixture is filtered and the solid is dried. The solid is extracted first with water and then with dilute potassium hydroxide solution and the combined extracts are stirred with charcoal and filtered. When the filtrate is saturated with carbon dioxide, a white powdery solid precipitates. This solid is filtered off, washed well with water and dried. The product is readily purified by recrystallization from butanone to give 4-hydroxy-3-phenylcinnoline melting above 260° C. This material is sufficiently pure for further chemical transformations but an analytical sample, melting at about 268–270° C., is obtained by sublimation or by recrystallization from 2-butanone or ethanol.

The results obtained in the conversion of 3-phenylcinnoline-4-carboxylic acid to 4-hydroxy-3-phenylcinnoline when the relative amounts of the constituents of the reaction mixture are varied can be summarized in the following table:

| Amount Carboxylic Acid, g. | Amount 50% KOH, ml. | Amount Mineral Oil, ml. | Amount Copper Bronze, g. | Amount Copper Oxide, g. | Yield of Product, Percent |
|---|---|---|---|---|---|
| 25 | 50 | 200 | 50 | 50 | 57 |
| 5 | 10 | 200 | 5 | | 20 |
| 5 | 10 | 200 | 5 | 5 | 55 |
| 20 | 40 | 300 | | 40 | 30 |
| 22.5 | 45 | 300 | 20 | 40 | 59 |

It should be recognized that it is possible to make modifications in the procedure detailed above, such as in the method of isolating the product, without avoiding the inventive concept involved therein.

Substituted compounds can also be used in the above procedure when the substituents are substantially inert to the action of hot base. Thus, the reaction is applicable to compounds in which a lower alkyl substituent such as methyl or ethyl or a lower alkoxy substituent such as methoxy or ethoxy is present on the 3-phenyl ring or on the benzene portion of the cinnoline nucleus. For example, 3-(4-methoxyphenyl)cinnoline-4-carboxylic acid is converted to 4-hydroxy-3-(4-methoxyphenyl)cinnoline. Likewise, 6-methyl-3-phenylcinnoline-4-carboxylic acid and 3-(4-tolyl)cinnoline-4-carboxylic acid give 4-hydroxy-6-methyl-3-phenylcinnoline and 4-hydroxy-3-(4-tolyl)cinnoline respectively. In each case, the substituted carboxylic acid used as the starting material is obtained by the same known procedure referred to above and used for the preparation of 3-phenylcinnoline-4-carboxylic acid.

The 4-hydroxy-3-phenylcinnolines, which are products of the present procedure, can serve as intermediates for the preparation of a variety of useful compounds. Thus, the reaction of 4-hydroxy-3-phenylcinnoline with phosphorus oxychloride according to known procedures gives 4-chloro-3-phenylcinnoline. Reaction of this chloro compound with 2-diethylaminoethylamine with gentle heating in an inert solvent gives 4-(2-diethylaminoethylamino)-3-phenylcinnoline. Other dialkylaminoalkylaminocinnolines and (cyclic amino) alkylaminocinnolines can be prepared in a similar way. The alkyl groups in such compounds are, preferably, lower alkyl groups containing up to 6 carbon atoms. Such dialkylaminoalkylamino compounds are useful anti-bacterial and anti-algal agents. Thus, they inhibit the growth of the organisms *Chlorella vulgaris* and *Diplococcus pneumoniae*, and they inhibit the germination of seeds of trifolium. In addition, they also possess anti-hypertensive activity.

What is claimed is:

1. The method of preparing 4-hydroxy-3-phenylcinnolines which comprises heating a suspension of
   (a) the potassium salt of a 3-phenylcinnoline-4-carboxylic acid in which any substituents are substantially inert to the action of hot potassium hydroxide,
   (b) potassium hydroxide,
   (c) a promoter selected from the group consisting of copper bronze, copper oxide, and mixtures of copper bronze and copper oxide, and
   (d) an inert diluent having a boiling point of at least 300° C.

to a temperature of at least 300° C. and isolating the 4-hydroxy-3-phenylcinnoline from the reaction mixture.

2. The method described in claim 1 wherein the diluent is mineral oil.

3. The method according to claim 2 wherein the promoter is a mixture of copper bronze and copper oxide.

4. The method according to claim 3 wherein the starting material is 3-phenylcinnoline-4-carboxylic acid.

No references cited.